W. H. Van Gieson,
Nail.
Nº 34,534.     Patented Feb. 25, 1862.
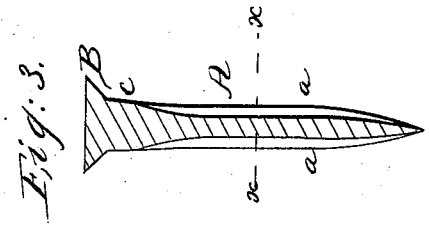
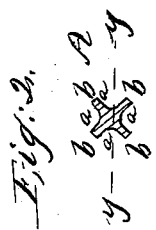
Witnesses                           Inventor:

UNITED STATES PATENT OFFICE.

W. H. VAN GIESON, OF NEW YORK, N. Y.

IMPROVEMENT IN NAILS FOR SHEATHING.

Specification forming part of Letters Patent No. 34,534, dated February 25, 1862.

*To all whom it may concern:*

Be it known that I, W. H. VAN GIESON, of the city, county, and State of New York, have invented a new and useful Improvement in Sheathing-Nails for Screwing Copper or Metal Sheathing to the Bottoms of Vessels; and I do hereby declare that the following is a full, clear, and exact description of the same, reference being had to the annexed drawings, making a part of this specification, in which—

Figure 1 is a perspective view of my invention; Fig. 2, a transverse section of the same, taken in the line $x\ x$, Fig. 3; Fig. 3, a longitudinal section of the same, taken in the line $y\ y$, Fig. 2.

Similar letters of reference indicate corresponding parts in the several figures.

The object of this invention is to obtain a sheathing-nail which will "hold" better than those of ordinary construction—that is to say, be more difficult to draw out from the wood or siding of the vessel, and consequently be more efficient in securing the sheathing thereto and have the nail at the same time require less force in being driven into the vessel's bottom and be equally as strong as the ordinary sheathing-nails and still have a considerable less weight of metal.

The invention consists in having the nail provided with longitudinal grooves formed in a cylindrical shank and extending from the point to within a short distance of the head of the nail, substantially as described.

To enable those skilled in the art to fully understand and construct my invention, I will proceed to describe it.

A represents the shank of the nail, and B the head. The shank A is of cylindrical form and has four longitudinal grooves $a\ a\ a\ a$, said grooves extending from the point of the shank to within a short distance of its head B, as shown clearly in Figs. 1 and 3. The four grooves $a$ form, of course, a corresponding number of longitudinal flutes or ribs $b$, the outer surfaces of which are of convex form, being the portions of the exterior of the shank between the grooves, as shown in Fig. 2.

The smooth cylindrical portion $c$ of the shank adjoining the head B is essential, as it renders the shank very strong adjoining the head—a point where the greatest strength is required. The grooves $a$ give a greater external surface to the shank of the nail than if the same were cylindrical, and hence they hold better in the wood and possess greater strength than the cylindrical ones of an equal weight of metal. The grooved shank also enters or penetrates the wood much more readily than a cylindrical or square shank.

Nails constructed according to my invention may be cast or swaged in proper form. The usual materials—copper and composition—are employed. Four grooves $a$ will probably be used; but there may be more or less, as desired.

Having thus described my invention, what I claim as new, and desire to secure by Letters Patent, is—

A sheathing-nail made with converging flanges and with grooves between the flanges, said flanges converging at the point of the nail and the grooves terminating a short distance below the head, as herein shown and described.

W. H. VAN GIESON.

Witnesses:
JAMES LAIRD,
J. W. COOMBS.